E. Russell,
Oscillating Steam Engine.
N⁰ 32,787.         Patented July 9, 1861.
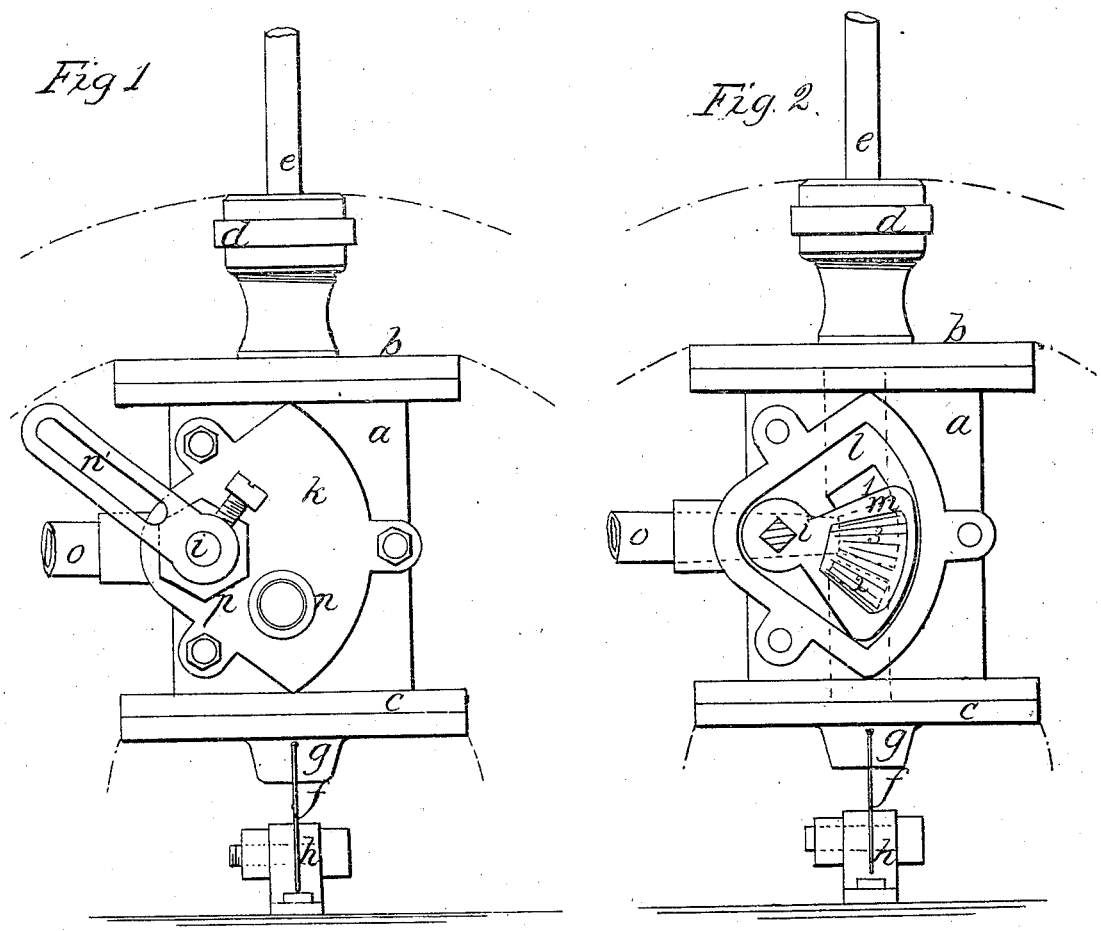

UNITED STATES PATENT OFFICE.

EDMUND RUSSELL, OF BROOKLYN, NEW YORK.

OSCILLATING STEAM-ENGINE.

Specification of Letters Patent No. 32,787, dated July 9, 1861.

*To all whom it may concern:*

Be it known that I, EDMUND RUSSELL, of Brooklyn, in the county of Kings and State of New York, have invented, made, and applied to use a certain new and useful Improvement in Oscillating Engines; and I do hereby declare that the following is a full, clear, and exact description of my said invention, reference being had to the annexed drawing, making part of this specification, wherein—

Figure 1, is a side elevation of my engine cylinder and Fig. 2, is a similar view with the steam chest removed to show the valve.

Similar marks of reference denote the like parts.

In oscillating engines it is usual to have the cylinder set and moving upon trunnions or gudgeons; this mode causes considerable friction, whether the trunnions are located near the center or toward the end of the cylinder.

The nature of my said invention consists in applying a spring or springs at the point of oscillation in such a manner that the spring or springs become a means of connection to the frame and also allow the cylinder to swing with the piston-rod and crank pin. The valve which I apply is also fitted in a peculiar manner to regulate the admission and exhaust of steam.

In the drawing $a$, is the steam or other cylinder, $b$, and $c$, are the heads, $d$ is the stuffing box and $e$, the piston rod as usual, said piston rod passing to the crank pin where it is connected in the well known manner.

$f$ is a spring composed of one or more leaves, and of any desired width so as to obtain the necessary strength of material; this spring $f$ is attached at one end to the cylinder head $c$, of the engine, by the flanges $g$, and at the other end to the bed of the engine by the flanges $h$. This spring $f$ allows the cylinder to swing or oscillate and avoids the friction now usual to the trunnions, besides this the strength of the spring aids in sustaining the weight of the cylinder at the extreme points of vibration and tends to give the return motion to the cylinder thus counteracting the inertia and relieving the cylinder stuffing box and piston rod of much of the strain and friction now incidental to oscillating engines.

$n$, is the steam pipe and $o$, is the exhaust pipes. These are on the chest $k$, and the respective pipes may be fitted with sliding or turning sleeves or sockets, or with flexible pipes so as to allow of the motion of the steam chamber $k$ with the cylinder $a$.

$m$, is a valve made as about a quarter circle, and set upon a stem $i$, that enters at the apex of said valve; $p$, is a stuffing box to said stem and 1 and 2, are the induction ports and 3, the eduction port. The valve $m$, is to be made hollow or D formed and acts to open and close the respective ports.

$n'$, is an arm projecting from the stem $i$, which arm may be worked by a fixed pin or by a rod to an eccentric on the main shaft in any convenient way.

What I claim and desire to secure by Letters Patent is—

1. The spring $f$ applied as a means for connecting the cylinder to the frame of the engine and allowing for the oscillation in the manner and for the purposes set forth.

2. The arrangement of the valve $m$, stem $i$, and the induction and eduction ports, 1, 2 and 3 in the oscillating cylinder applied as and for the purposes specified.

In witness whereof I have hereunto set my signature this twenty fifth day of May 1861.

E. RUSSELL.

Witnesses:
LEMUEL W. SERRELL,
THOS. GEO. HAROLD.